G. DOUTNEY.
AUTOMATIC FEED BAG.
APPLICATION FILED JUNE 29, 1911.
1,022,183.
Patented Apr. 2, 1912.
3 SHEETS—SHEET 1.
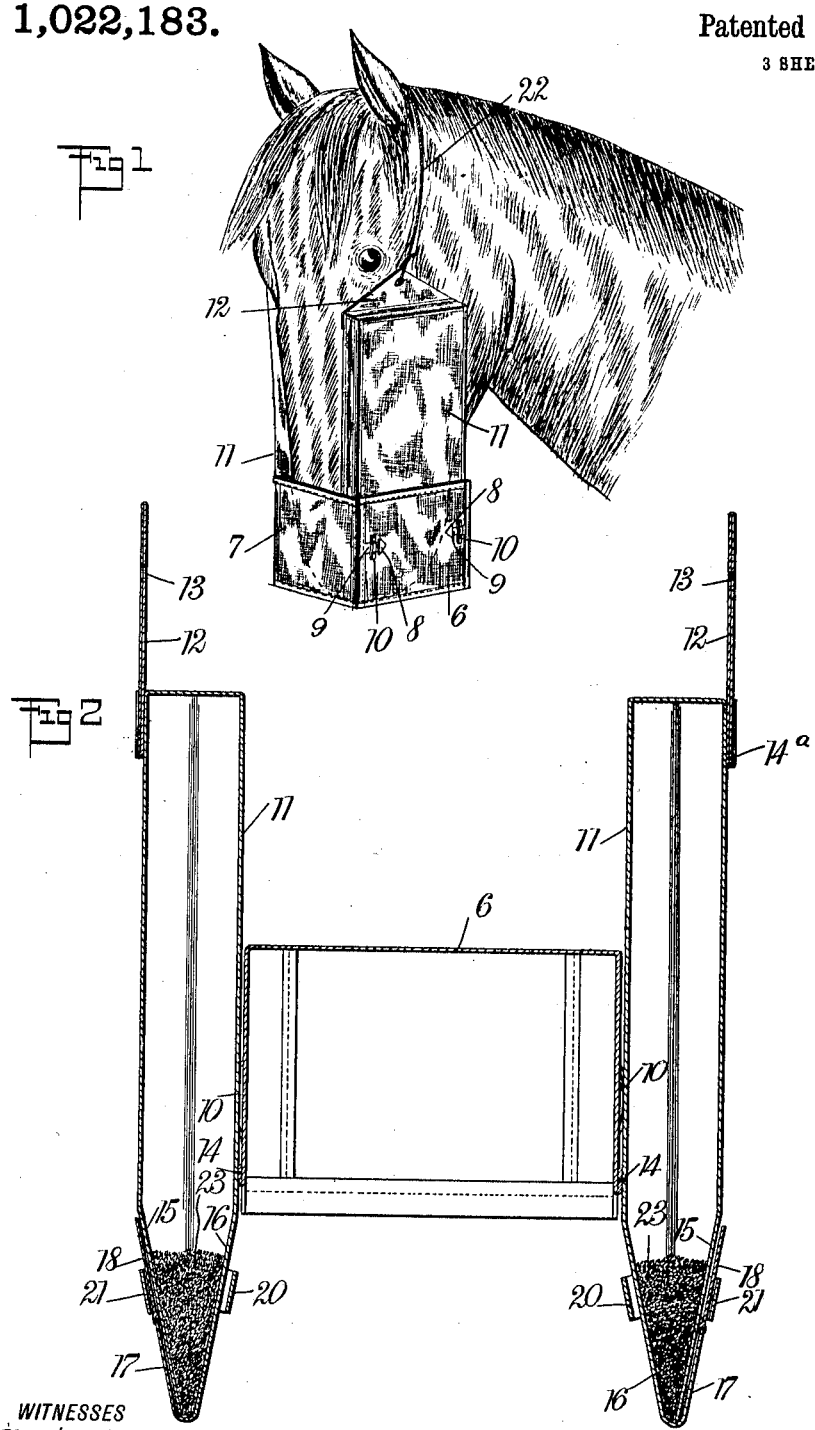
WITNESSES
C. J. Hachenburg.
Walton Harrison
INVENTOR
George Doutney
BY Munn & Co.
ATTORNEYS

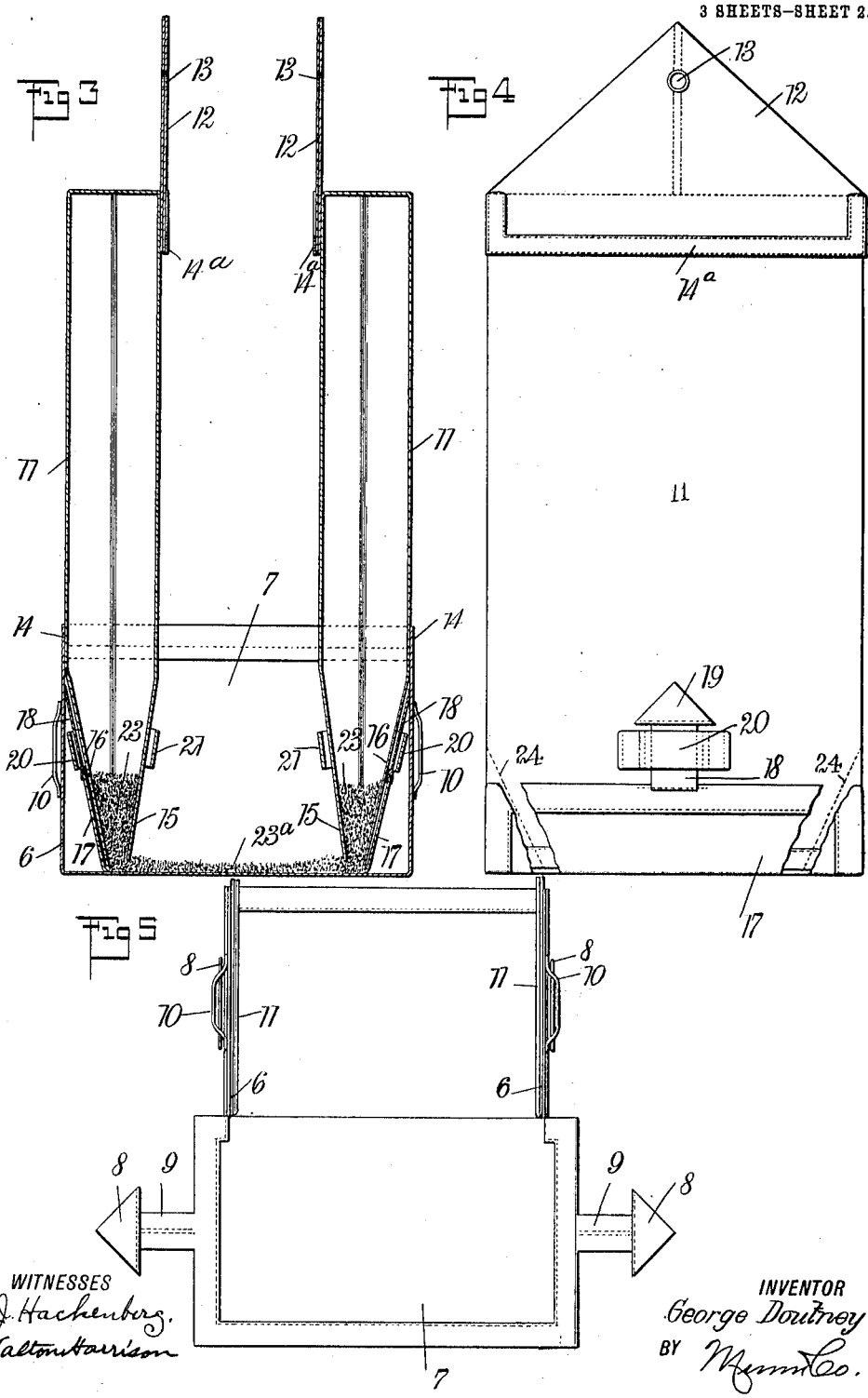

G. DOUTNEY.
AUTOMATIC FEED BAG.
APPLICATION FILED JUNE 29, 1911.
1,022,183.
Patented Apr. 2, 1912.
3 SHEETS—SHEET 3.
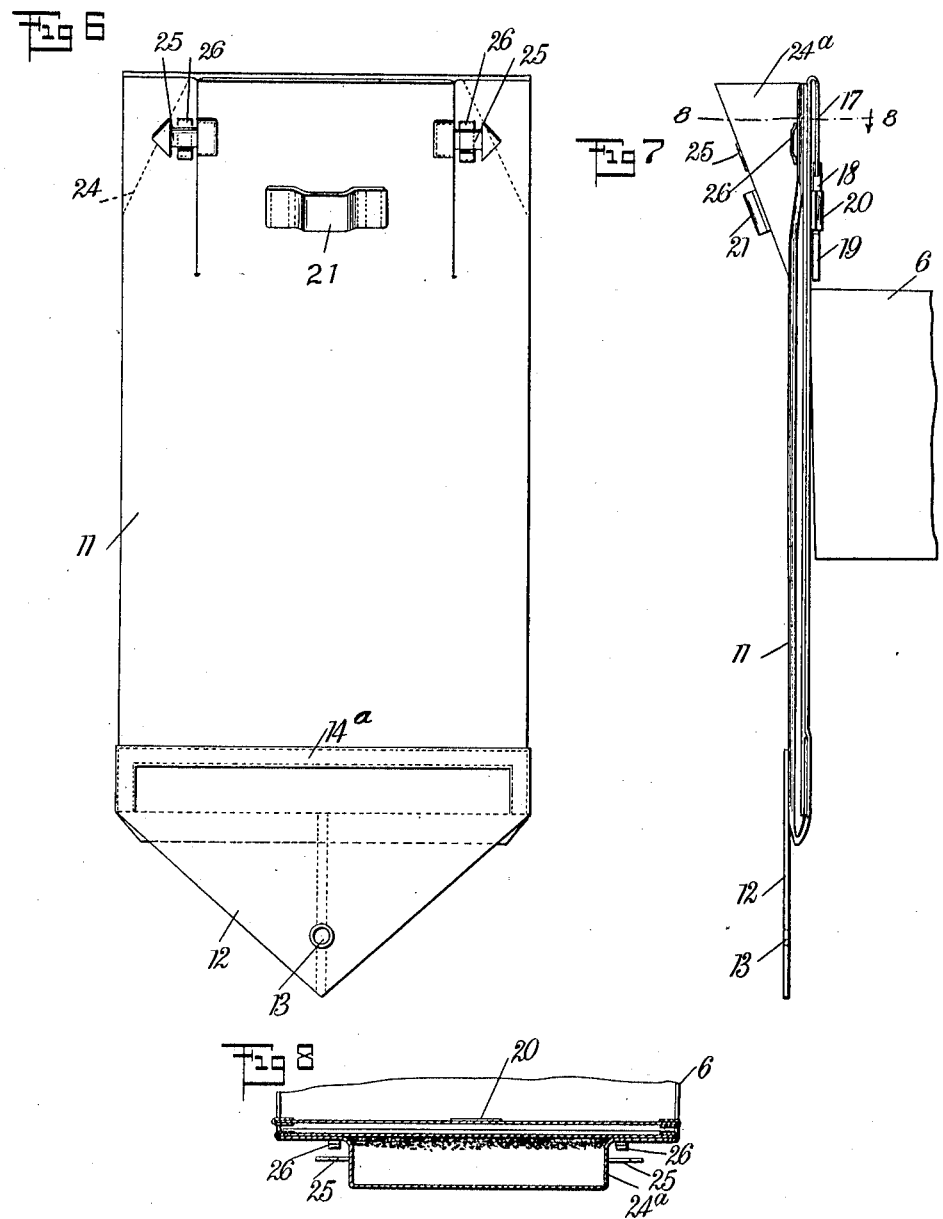

UNITED STATES PATENT OFFICE.

GEORGE DOUTNEY, OF NEW YORK, N. Y.

AUTOMATIC FEED-BAG.

1,022,183.  Specification of Letters Patent.  Patented Apr. 2, 1912.

Application filed June 29, 1911. Serial No. 635,915.

*To all whom it may concern:*

Be it known that I, GEORGE DOUTNEY, a citizen of the United States, and a resident of the city of New York, borough of Brooklyn, in the county of Kings and State of New York, have invented a new and Improved Automatic Feed-Bag, of which the following is a full, clear, and exact description.

My invention relates to feed bags of the kind used for feeding animals, and more particularly of the horse kind, the purpose of my invention being to provide a neat and cheap feed bag admitting of a variety of uses and adapted to facilitate the breathing of the animal while feeding, and also to economize the grain or other food employed.

Reference is to be had to the accompanying drawings forming a part of this specification in which like characters of reference indicate corresponding parts in all the views, and in which—

Figure 1 is a perspective view showing the improved automatic feed bag in use; Fig. 2 is a substantially central vertical cross section through the bag showing it in the position which it occupies when suspended from a wagon body and otherwise temporarily out of use; Fig. 3 is a central cross section of the bag showing it in its normal position; that is, the position it occupies during the act of feeding; Fig. 4 is a side elevation of the device as shown in Fig. 2; Fig. 5 is a fragmentary elevation showing the feed bucket with one of its sides let down for the purpose of promoting accessibility to the interior of the feed bucket; Fig. 6 is a side elevation showing one of the pockets when swung out of the feed bucket and turned with its opening uppermost to facilitate placing food in the pocket; Fig. 7 is a fragmentary front elevation similar to Fig. 6, but showing the opening of the pocket as distended in order to receive the food; and Fig. 8 is a fragmentary section on the line 8—8 of Fig. 7 looking in the direction of the arrow.

The feed bucket is shown at 6, and is made of any suitable material, preferably canvas or other heavy cloth. It is provided on its opposite sides with two doors 7 which are simply flaps made of canvas or other cloth, and which may be continuous with the body portion of the bucket. Each door 7 carries upon its opposite edges a pair of tongues 9, each of which is provided with a triangular portion 8. These tongues, because of their general shape, I designate as arrow head tongues. The bucket 6 is further provided with two ears 10, each preferably made of a short strap of flexible material secured at its ends to the feed bucket and thus constituting a loop through which the triangular portions 8 of the arrow head straps may be thrust, as indicated in Fig. 1, in order to hold the doors in their normal positions.

I provide two pockets 11 which may be of the same material as the bag, or of a different material, as desired. Connected with these pockets are flaps 12 provided respectively with holes 13 by aid whereof the entire device may be suspended. The pockets 11 are, by aid of stitches 14, secured directly to the upper edges of the feed bucket. The flaps 12 are secured to the pockets 11 by seams 14$^a$. The edges to which the pockets are secured being flexible, the pockets are adapted to swing or turn relatively to the feed bucket. Owing to this arrangement the pockets may be swung entirely out of the feed bucket so as to leave the latter inverted, as indicated in Fig. 2. Each pocket 11 is provided with sloping portions 15, 16, which, at their bottoms, are close together, thus forming a reduced opening through which the grain or other material may be slowly passed out. The sloping portion of each pocket is provided with a flap 17, the latter having a tongue 18 which carries a triangular portion 19, the tongue with its triangular portion together constituting an arrow head tongue, as will be understood from Fig. 4. The sloping portions 15, 16 are provided with straps 21, 20 sewed by their ends and formed into eyes through which the arrow head tongues may be thrust so as to hold the flaps 17 in either of two predetermined positions, as will be understood by contrasting Figs. 2 and 3. A cord 22 (see Fig. 1) is fastened to the flaps 12 by aid of the holes 13 and is used for supporting the feed bag either upon the animal's head, as indicated in Fig. 2, or in an inverted position according to Fig. 2. The grain within the pockets 11 is shown at 23, and a portion of grain fed from these pockets into the feed bucket appears at 23$^a$, as indicated in Fig. 3.

Each pocket 11 is provided with two seams 24 disposed obliquely to each other, as indicated in Fig. 4. These seams are merely stitched lines disposed obliquely across the corners of the pockets adjacent to their openings and serve to center the flow of the grain through each pocket into the feed bucket. In doing this the grain is rendered more accessible to the animal's mouth.

By slitting each pocket 11 and inserting a triangular gore 24$^a$ in the slit thus formed, I give a somewhat flaring form to the general opening of the pocket. This facilitates the introduction of grain into the pocket, and also facilitates the gradual emptying of the pocket during the operation of feeding.

I provide for each pocket a pair of arrow head tongues 25 and loops 26 through which these tongues may be thrust in order to hold the gores folded and thus practically reduce the size of the opening of the pocket. If the arrow head tongues be released from the loops, therefore, the opening is practically rendered larger than when the straps are connected.

The operation of my device is as follows: Since the pockets 11 each have but one opening, (see bottom of Figs. 2 and 3), this opening is used for purposes of filling the pockets at intervals and for emptying them during the process of feeding. In order to fill the pockets, it is sometimes desirable that they be swung entirely out of the feed bucket 6. This is readily accomplished, as above described. The material to be used in feeding, usually grain, is filled into the pockets and the straps 17 are brought around and slipped through the loops 21, as indicated in Fig. 2. The grain is now unable to spill out and the feed bag may be suspended in the position indicated in Fig. 2 and thus carried indefinitely, say, upon the under side of a wagon. Suppose, now, it is desirable to use the bag for feeding. The pockets 11 are turned relatively to the feed bucket, and the entire device is then turned into the position indicated in Fig. 3. The straps 17 are next released from the loops 20, as indicated in this figure. This leaves the pockets 11 open at their bottoms, and the grain 23 is gradually fed out from them into the feed bucket. The feed bag being now mounted upon the horse's head, the animal eats the portion 23$^a$ of the grain within the bucket. As this portion is consumed, the grain flows again down from the pockets, the motions made by the animal's head and jaws facilitating this object. If, for any reason, after the animal is fed, there remains any grain in the pockets 11, this grain may be saved by turning the straps 11 back upon the sloping portions 16 of the pockets, and securing the straps by aid of the loops 20. The pockets may now be swung outside of the feed bucket, as indicated in Fig. 2, and such grain as still remains in the pockets will stay there and is thus saved. By virtue of the seams 24, the openings of the pockets are practically rendered narrower; that is, in a direction coinciding with the general plane of the pocket so that the food in escaping from the opening into the feed bucket is within convenient reach of the animal's mouth. This arrangement also facilitates the flow of grain from the opening, the grain being discharged through an essentially hopper-shaped opening. As above explained, the openings may be virtually contracted or enlarged, at the will of the operator, by fastening or releasing the arrow head tongues 25 from said respective loops. In practice, therefore, if the operator finds that the openings in the pockets are not of proper size or capacity, he runs the arrow head tongues through the loops associated with them, or releases said tongues from said loops, as the case may be, in order to give the general openings of the pockets such capacity as he deems necessary.

While usually it is not necessary to open the feed bucket in order to fill the pockets, or to repair them if they be actually damaged, yet whenever desired the operator may, by disengaging the arrow head tongues 9 from the adjacent loops 10 cause the doors 7 to swing downward, as indicated in Fig. 5.

I do not limit myself to any particular material to be used in the construction of the feed bag above described, or of any of its parts. Neither do I limit myself to the precise arrangement indicated for the several parts, nor any of them, the scope of my invention being commensurate with my claims.

Having thus described my invention, what I claim as new and desire to secure by Letters Patent is:—

1. A feed bag comprising a feed bucket, a pair of pockets, each pocket having ends and being connected between said ends with said bucket and adapted to turn into different positions relatively to said bucket for the purpose of bringing portions of said pockets into and out of said feed bucket, and means for suspending said pockets directly upon the head of an animal to be fed.

2. A feed bag comprising a feed bucket, and a supply pocket having an outlet at its lower end and suspending means near the top, the said pocket having a swinging connection with the bucket at the upper edge of the latter and at a point on the pocket removed from the outlet end, the said pocket being movable on its connection through an arc sufficient to swing the outlet end to the inside of the bucket or to the outside thereof.

3. A feed bag comprising a feed bucket and a pocket having its lower end disposed within and opening within the bucket, said pocket having a hinge connection with the upper end of the bucket on which the pocket has a movement in an arc to remove the lower end from said bucket.

4. A feed bag comprising a feed bucket and a pocket having a connection at a point intermediate its ends with said bucket, the pocket being formed with a discharge opening at one end and being movable on said connection to swing the end with the discharge opening into or out of said bucket.

5. A feed bag comprising a bucket and a pocket pivoted to the upper edge of said bucket, so as to render said pocket movable relatively to said bucket through an arc of approximately 180 degrees, said pocket in one position having one end within the bucket along the side thereof, and the pocket in the other position lying along the exterior of the bucket.

6. A feed bag having a pocket hinged thereto and free to swing angularly a distance of 180 degrees, the pocket forming a supply container normally extending along its lower end below the hinge connection, the lower end of said pocket being free to swing upward when the pocket is moved on its hinge connection.

7. A feed bag comprising a feed bucket and a supply pocket having connection with the bucket at a point on the pocket intermediate the ends thereof, said pocket being free to swing on said connection so as to bring the lower end of the pocket to the top of the bucket or near the bottom thereof, the said lower end having an outlet opening and a laterally expansible member adjacent to said outlet opening for enlarging the same to facilitate the passage of the feed through said outlet opening.

In testimony whereof I have signed my name to this specification in the presence of two subscribing witnesses.

GEORGE DOUTNEY.

Witnesses:
 WALTON HARRISON,
 PHILIP D. ROLLHAUS.